Dec. 6, 1927.

B. A. LINDERMAN 1,651,897

DOVETAILING MACHINE

Filed Jan. 19, 1925      3 Sheets-Sheet 1

Inventor:
Bert A. Linderman
By Munday, Clarke & Carpenter
Attys.

Dec. 6, 1927.

B. A. LINDERMAN
DOVETAILING MACHINE
Filed Jan. 19, 1925

Inventor.
Bert A. Linderman
By Munday, Clarke & Carpenter Attys.

Patented Dec. 6, 1927.

1,651,897

UNITED STATES PATENT OFFICE.

BERT A. LINDERMAN, OF NEW YORK, N. Y., ASSIGNOR TO MUSKEGON MACHINE COMPANY, OF MUSKEGON, MICHIGAN, A CORPORATION OF MICHIGAN.

DOVETAILING MACHINE.

Application filed January 19, 1925. Serial No. 3,214.

My present invention relates to a machine for dovetailing lumber, such as shown in prior patents of A. T. Linderman and myself, one such patent being No. 1,052,600, granted to me February 11, 1913. The purpose of the machine is to join pieces of lumber together by means of interfitting dovetails formed in the edges thereof, and my invention relates particularly to the cutters employed for operating upon the board edges.

The principal feature of the invention is the provision of improved means for driving the cutter spindles and involves the use of motors mounted upon the spindles themselves for rotating them, thereby eliminating the relatively less efficient belt drives, and other mechanism heretofore employed for this purpose.

Numerous other objects and advantages of the invention will be apparent as it is better understood from the following description, which, taken in connection with the accompanying drawings, discloses a preferred embodiment thereof.

Referring to the drawings.

Figure 1:
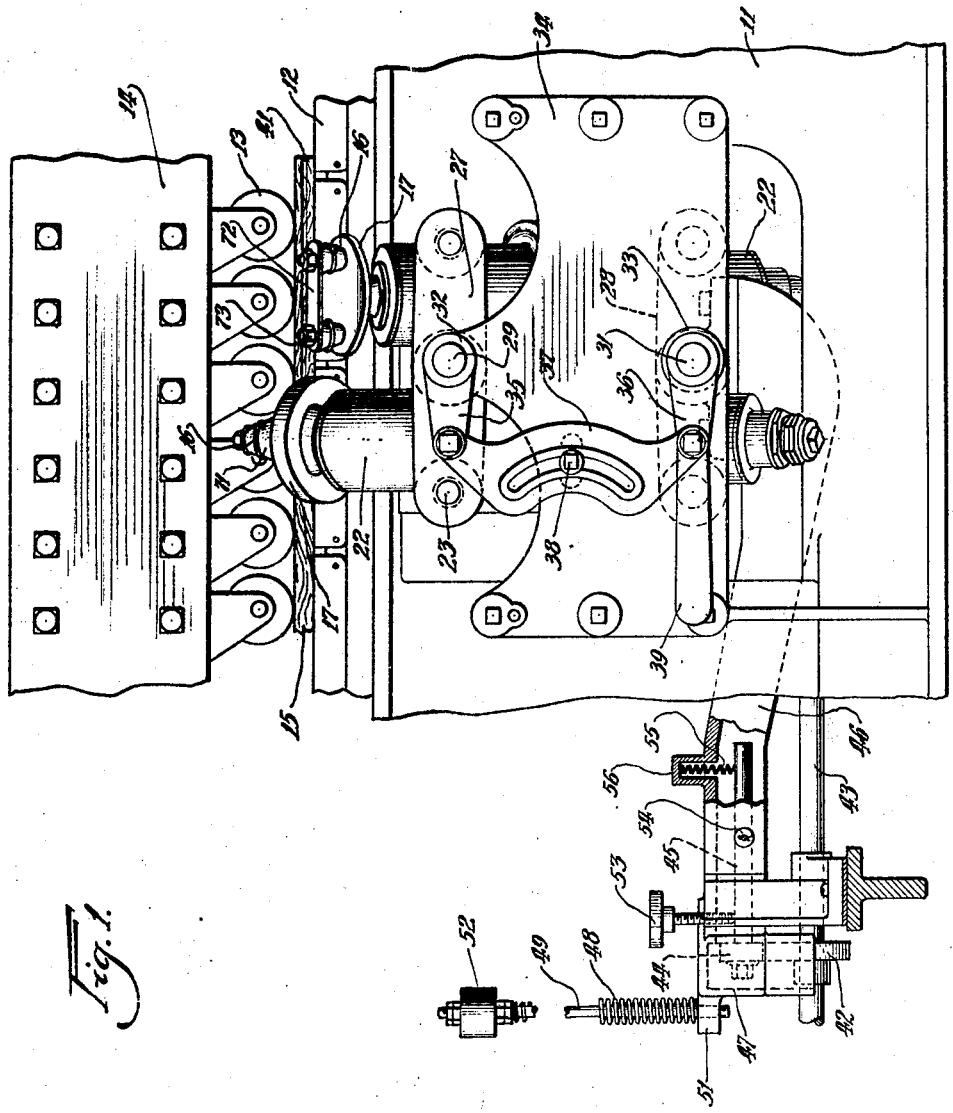
Figure 1 is an elevational view of a portion of a dovetailing machine, showing the manner in which the cutters are mounted and rocked to form the tapering, or wedge-shaped, dovetails.

In said drawings, I have shown, for illustrative purposes only, a preferred form of my invention, in which the reference character 11 indicates the frame of a machine for dovetailing lumber and of which only that portion in which my invention resides is shown.

Figure 2:
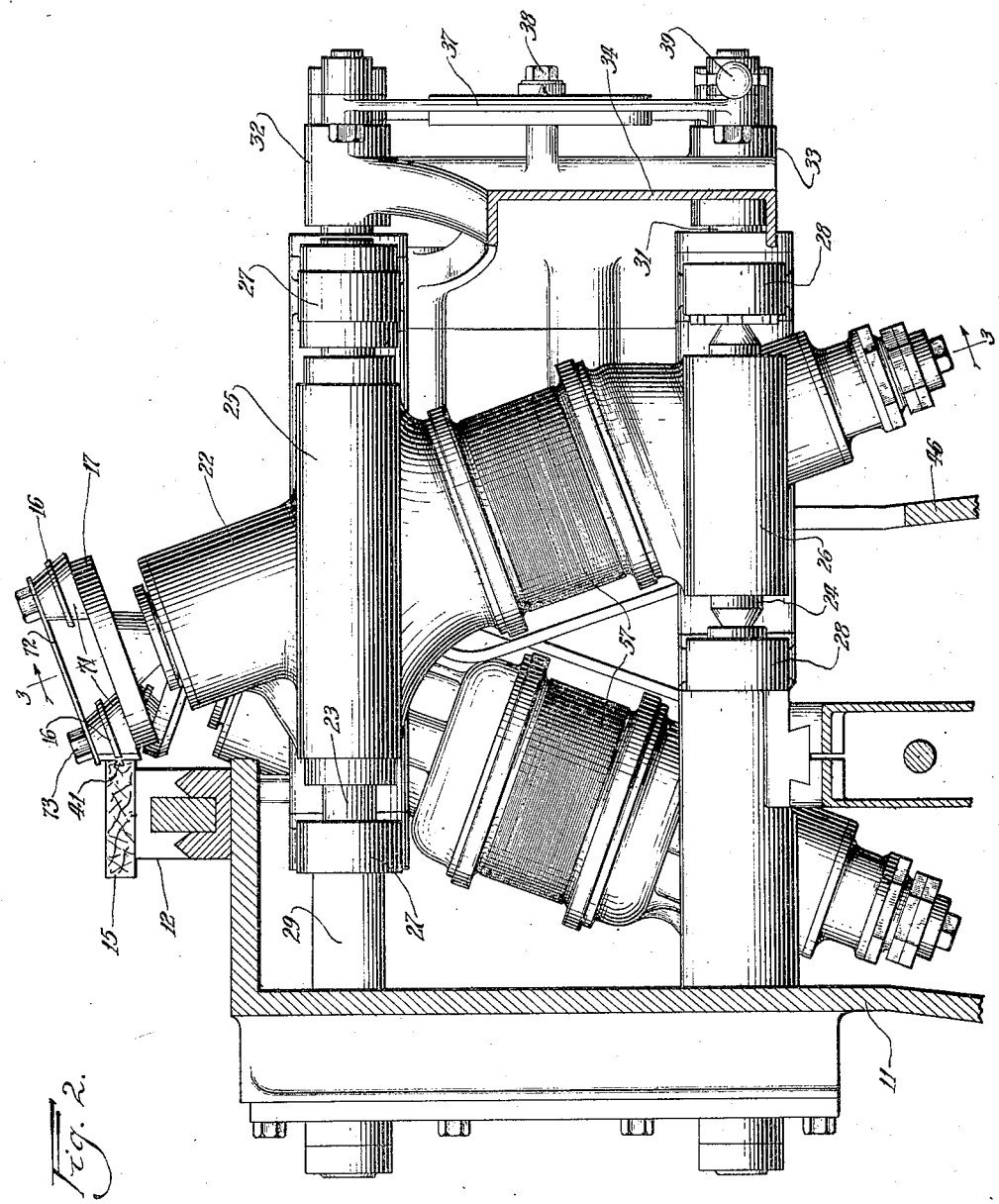
Fig. 2 is a view taken transversely through the frame and showing the cutter spindles and mounting therefor in end elevation, this view being drawn upon a larger scale than Fig. 1.

A conveyer chain 12 is mounted for travel upon the frame beneath a plurality of rollers 13 upon a presser bar 14, and the board 15 to be operated upon is held tightly between said rollers and conveyer chain as it is directed past cutters 16, which are mounted upon disks 17 at the upper end of rotating spindles 18, which have bearings 19 and 21 in housings 22, which are supported for adjustment and rocking motion in manner which will be presently described. Extending through and rigid with the housings 22, which in the present instance are two in number and arranged at opposite angles with respect to the board edge, are top and bottom supporting shafts, indicated respectively by the reference characters 23 and 24, which extend horizontally and are disposed within suitable recesses provided by enlargements 25 and 26 upon said housings so that vertical movement of the shafts will lift or lower the housings and therewith the cutters, for purposes which will later be more fully understood. The upper shafts 23 are connected by horizontal links 27 and the lower shafts are connected by similar links 28. Said links 27 and 28 are mounted upon eccentric shafts 29 and 31, which extend through the frame 11, as shown in Fig. 2, and have bearings 32 and 33 in a fixed front plate 34. Arms 35 and 36 upon the front ends of said shafts 29 and 31 are connected by means of an adjusting plate 37, adapted to be tightened upon the plate 34 by means of a clamp screw 38. A handle 39 extends from the arm 36 and is adapted to be manually operated to turn the shafts 29 and 31 and thereby raise or lower the spindle housings, in manner which will be readily understood. This adjustment serves to accurately locate the cutters with respect to the board, so that the groove may be formed at any predetermined point in the width of the board edge.

For the purpose of forming a tapering or wedge-shaped dovetail, of the type described in my prior patents referred to above, the cutters are rocked transversely to the length of the board so that one thereof is raised and the other lowered to increase or decrease the width of the slot 41 as the board passes, thus producing the desired taper. This means consists of a cam 42, mounted upon a shaft 43 rotated from any desired source of power and acting upon a roller 44, carried upon one end of a rod 45, protruding from an arm 46, which is rigidly connected with the cutter mounting such as by being connected to one of the lower links 28 as shown in dotted lines in Fig. 1 and as hereinbefore described. Said roller 44 is disposed in a housing 47, which is held in its down position by means of a spring 48, mounted upon a rod 49 in a projecting portion 51 of said housing and extending through a fixed bracket 52 on the frame. In order to adjust the roller 44 with reference to the cam, to determine the width of the slot 41 in the board, a set screw 53 is employed, extending through the housing 47 and contacting with the rod 45, which latter is pivoted at 54 in said housing and is held in contact with said screw by means of a spring 55 acting thereon on the opposite side of the pivot 54, said spring being disposed in an upwardly extending recessed part 56 upon said housing.

Figure 3:
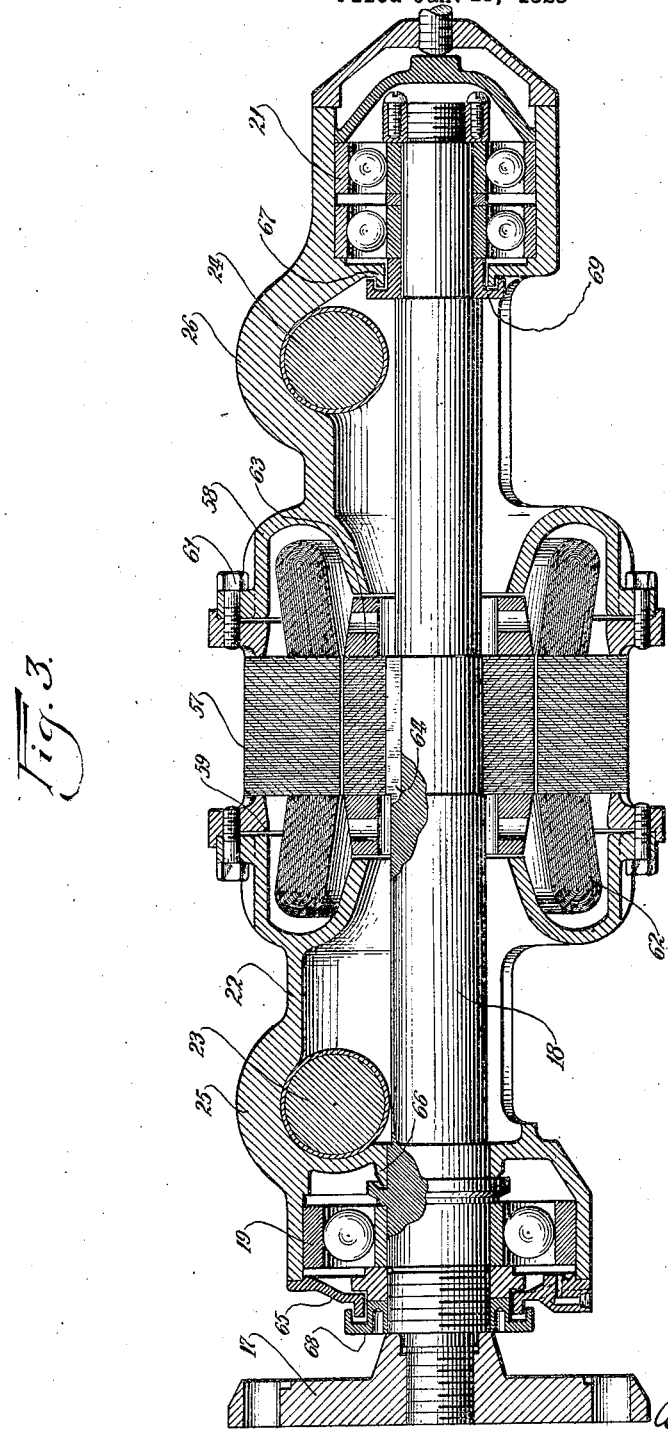
Fig. 3 is a still further enlarged sectional view, taken longitudinally through a spindle housing, substantially upon the section line 3—3 in Fig. 2, and showing the motor in section.

For the purpose of driving the spindles 18, I employ motors, generally indicated by the reference character 57, which may be wound with field and armature windings in any suitable or preferred manner, the specific form of the motor comprising no part of my invention. A suitable resisting portion 58 is provided in the housing 22 for the motor and a removable section 59, held in place by means of screws 61, is employed to enclose the motor, which, it will be understood, includes outer non-rotatable elements 62 and inner rotatable elements 63 keyed to the shaft, as indicated at 64. As will be noted from Fig. 3, the housing 22 is provided with a flanged ring 65 at the upper end thereof and with flanges 66 and 67 on the interior of the housing cooperating with flanged collars 68 and 69 upon the shaft 18 so that the parts may be lifted as a unit as and for the purpose hereinbefore described.

The cutters 16 are formed upon cones 71, rotatably mounted upon disks 17 and connected by means of bars 72 held in place by means of clamping nuts 73. The cutters upon the spindle shown at the left in Fig. 1 are adapted to cut the lower side of the groove 41 and the cutters upon the spindle shown at the right in said Fig. 1 are adapted to cut the upper side of the groove, in manner which will be apparent from inspection of Fig. 2, and by driving the spindles with the motors 57 mounted directly thereon, very rapid and highly efficient operation becomes possible and the machine is greatly improved.

It will be appreciated that by the use of my invention I am able to join together relatively thin boards provided with from one to four or more tongues and grooves. By mounting the motors 57 directly upon the cutter spindles I am able to obtain a very high degree of accuracy in cutting which cannot be obtained in the old type of such mechanisms where the cutter spindles are belt driven because of the tendency of the spindle to vibrate longitudinally when belt driven and supported in the usual manner. In my improved construction a high degree of perfection is obtained by mounting the motors directly on the spindles and by mounting the spindles in a manner so that the cutters and spindles together with the motors may be shifted transversely of the board feed by means of the automatic mechanism or otherwise, during the operation of the cutters that is, when they are rotating. It will also be appreciated that I have provided a new construction in the manner of varying the range of the rocking movement of the links 28 by means of the construction shown at the left hand side of Figure 1. This construction involves the use of the pivoted rod 45 carrying the roller 44 and the adjustable screw stop 53 so that the roller 44 may be adjusted relatively toward or away from the rotatable cam 42. This determines the extent of throw of the rocker arm 46 and hence the range of the transverse movement of the two cutters 71 and 72 for variably controlling the width of the groove formed by the cutters. In providing directly driven cutter spindles a new and beneficial result is accomplished, this being the production of more accurate dovetails or grooves. When the cutter spindles are belt driven from an outside source as in prior devices, in order that the belt be capable of transmitting sufficient power and speed to the cutters under operating loads, it is essential that the belts be held tightly against the pulleys or spindles and, when so held, a heavy operating strain is produced at one side of the bearings which rapidly wears the bearings at the point of engagement until such bearings are worn out of alignment. At the same time the shaft becomes decidedly loose in its bearings. With the cutter operating on a spindle mounted in loose bearings, it is impossible to obtain a uniform accurate groove or dovetail since any looseness in the bearings permits the vibration of a cutter spindle and causes the cutter to form wavy or irregular walls and grooves of irregular depth. By substituting my improved motor-driven spindle for the heretofore used belt drives, the power is applied substantially uniform and when in operation, the spindle is floating except for the working strain of the cutter. Since the bearings will last indefinitely under such a strain accurate and perfect grooves may be formed over an extended period of time. The movement of the cutters in a direction across the edge of the board passing through the machine is also more uniform since there is no side slapping action such as is present in all belt drives and which action causes the spindle to move or vibrate axially.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In a machine for dovetailing lumber, the combination of board feeding means, a plurality of rotatable cutters mounted to operate upon the edge of a board as it is moved by said feeding means, motors comprising spindles which they rotate and upon which cutters are mounted, and means for mounting said motors so as to be bodily movable with the spindles and substantially axially thereof whereby accurately to locate the planes of cut of said cutters.

2. In a machine for dovetailing lumber, the combination of board-feeding means, cutters mounted to operate upon an edge of a board as it is moved by said feeding means, a motor housing arranged to support each of said cutters, and means for shifting said cutters transversely to the direction of movement of a board passing through the machine, said means including a plurality of links attached to said housings at their ends, a plurality of shafts arranged to support said links at their center and in spaced pairs, and means for rocking said links about said shafts.

3. In a machine for dovetailing lumber, the combination of board-feeding means, cutters mounted to operate upon an edge of a board as it is moved by said feeding means, a motor housing arranged to support each of said cutters, and means for shifting said cutters transversely to the direction of movement of a board passing through the machine, said means including a plurality of links attached to said housings at their ends, a plurality of eccentrically mounted shafts arranged to support said links at their centers and in spaced pairs, means for simultaneously adjusting said shafts for controlling the normal position of said cutters, and automatic means for rocking said links about said shafts.

4. In a machine for dovetailing lumber, the combination of board-feeding means, cutters mounted to operate upon an edge of a board as it is moved by said feeding means, a motor housing arranged to support each said cutter, and means for shifting said cutters transversely to the direction of movement of a board passing through the machine, said means including a plurality of links attached to said housings at their ends, a plurality of eccentrically mounted shafts arranged to support said links at their centers and in spaced pairs, means for simultaneously adjusting said shafts for controlling the normal position of said cutters, and automatic means for rocking said links about said shafts, said last mentioned means being adjustable to control the range of action of said cutters.

5. In a dovetailing machine for lumber in combination with board feeding means, a support, upper and lower shafts thereon, eccentric bearings on said shafts, upper and lower links mounted on said eccentrics intermediate the ends of said links, manual means to shift said bearings to raise and lower said links, upper and lower pairs of cross shafts carried on the ends of the links, two cutter spindles mounted on said cross shafts and disposed in spaced inclined position relatively, motors mounted directly on said spindles, an arm connected to a link and automatic means for rocking said arm, said means including a rod pivoted intermediate its length on said arm a friction roller on the end of said rod a rotatable cam for periodically shifting said friction roller a spring adapted to force said roller away from said cam and an adjusting screw for limiting the movement of said roller away from said cam.

6. In a dovetailing machine for lumber in combination with board feeding means, a support, upper and lower shafts thereon, eccentric bearings on said shafts, upper and lower links mounted on said eccentrics intermediate the ends of said links, means to shift said bearings to raise and lower said links, upper and lower pairs of cross shafts carried on the ends of the links, a cutter shaft housing mounted on each pair of cross shafts said housing extending the length of the cutter shaft and comprising two opposed end portions detachably connected by an intermediate portion, the opposed end portions having inwardly extending flanges engaging collars on the shaft so that the parts may be removed as a unit.

7. In a dovetailing machine for lumber in combination with board feeding means, a support, upper and lower shafts thereon, eccentric bearings on said shafts, upper and lower links mounted on said eccentrics intermediate the ends of said links, means to shift said bearings to raise and lower said links, upper and lower pairs of cross shafts carried on the ends of the links, two housing sections each having an internal seat adapted to embrace a cross shaft and said sections being detachably interconnected and having inwardly extending flanges, a cutter shaft mounted in the housing sections and having collars adapted to engage the flanges and a motor mounted on the shaft and housing sections at the point of interconnection of the housing sections.

8. In a dovetailing machine for lumber in combination with board feeding means, a support, upper and lower shafts thereon, eccentric bearings on said shafts, upper and lower links mounted on said eccentrics intermediate the ends of said links, means to shift said bearings to raise and lower said links, upper and lower pairs of cross shafts carried on the ends of the links, two housing sections, each having an internal seat adapted to embrace a cross shaft and said sections being detachably interconnected by a third section located substantially intermediate the length of the housing, a cutter shaft, bearings for the shaft detachably mounted in the end sections of the housing, a motor armature mounted on the cutter shaft between its ends and a motor field mounted on the third section of the housing.

9. In a machine for dovetailing lumber, the combination of board feeding means, a supporting frame, two cutters adapted to cut opposite portions of the dovetail, said cutters having shafts mounted in bearings at their opposed ends and said bearings being carried by the frame, and said cutter shafts having motors mounted thereon intermediate their ends whereby to prevent vibration of the cutters during rotation of the cutter shafts by the motors, means for automatically shifting said cutters oppositely and transversely to the direction of movement of a board passing through the machine and means for adjusting the range of action of said automatic movement of the cutters.

10. In a machine for dovetailing lumber, in combination with board feeding means, a frame having pivotal bearings, two cutter shafts spaced apart and rockably mounted on said bearings, a motor mounted on each cutter shaft substantially intermediate its ends and roller bearings for the opposite ends of each cutter shaft, said roller bearings being carried by said frame, means for shifting the pivotal bearings for positioning the cutters, automatic means for rocking the cutters about said bearings, and means for adjusting the extent of such rocking movement.

BERT A. LINDERMAN.